United States Patent
Ueoka et al.

(10) Patent No.: US 8,046,392 B2
(45) Date of Patent: Oct. 25, 2011

(54) STORAGE SYSTEM AND INFORMATION TRANSFER METHOD FOR THE SAME

(75) Inventors: Atsushi Ueoka, Machida (JP); Toshio Otani, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 884 days.

(21) Appl. No.: 12/022,258

(22) Filed: Jan. 30, 2008

(65) Prior Publication Data

US 2008/0270697 A1 Oct. 30, 2008

(30) Foreign Application Priority Data

Apr. 27, 2007 (JP) ................................. 2007-118967

(51) Int. Cl.
*G06F 17/30* (2006.01)
(52) U.S. Cl. ........................ 707/828; 711/114
(58) Field of Classification Search .................. 707/821, 707/828, 829, 830, 999.2; 711/114
See application file for complete search history.

(56) References Cited

U.S. PATENT DOCUMENTS

| | | | | |
|---|---|---|---|---|
| 6,470,345 | B1 * | 10/2002 | Doutre et al. | 707/999.1 |
| 7,725,507 | B1 * | 5/2010 | van Rietschote et al. | 707/828 |
| 7,805,401 | B2 * | 9/2010 | Toner | 707/610 |
| 2003/0110237 | A1 * | 6/2003 | Kitamura et al. | 709/219 |
| 2004/0010654 | A1 | 1/2004 | Yasuda et al. | |
| 2005/0131902 | A1 * | 6/2005 | Saika | 707/10 |
| 2006/0020636 | A1 | 1/2006 | Murotani | |
| 2009/0077097 | A1 * | 3/2009 | Lacapra et al. | 707/10 |

FOREIGN PATENT DOCUMENTS

| | | |
|---|---|---|
| JP | 200446661 A | 2/2004 |
| JP | 200639814 A | 2/2006 |

OTHER PUBLICATIONS

"Copy Folder With Long File Names", Windows Users Group Network—General Discussion Forum, message thread beginning Aug. 31, 2007, 5 pages.*
"Want to Map Symbolic Links as Windows Shortcuts", Samba.org Samba-Technical Mailing List, message thread beginning Apr. 23, 2001, 3 pages.*
Dick Lewis, "Robocopy XP010 FAQ", Windows Scripting Solutions, Dec. 2004, pp. 6-9.*
"Folder Hierarchy and File Naming Rules", Tom's Hardware—General Discussion Forum, message thread beginning Jul. 31, 2005, 7 pages.*
Robbie Allen & Preston Gralla, "Windows XP Cookbook", published Aug. 8, 2005, O'Reilly Media, Inc., pp. 220-223.*

* cited by examiner

*Primary Examiner* — Cheryl Lewis
*Assistant Examiner* — Scott A Waldron
(74) *Attorney, Agent, or Firm* — Sughrue Mion, PLLC

(57) ABSTRACT

Before transferring a file, a CPU executes the following processing based on a transfer processing program: obtaining the directory tree structure of a transfer-source storage device; dividing the directory tree into directory trees so that each divided directory tree is structured within the full path length of a directory tree that can be handled by a transfer-destination storage device; associating the divided directory trees with each other; and then storing the associated directory trees in a volume of the transfer-destination storage device.

10 Claims, 11 Drawing Sheets

| TRANSFER-SOURCE DIRECTORY TREE | TRANSFER-DESTINATION DIRECTORY TREE | FORM |
|---|---|---|
| /aaaa/bbbb | /aaaa/bbbb | NO CHANGE |
| /bbbb/ccccc | /bbbb/ccccc | NO CHANGE |
| /bbbb/dd/···/ee/ff/···/gg/hh | /bbbb/dd/···/ee | Link |
| | /ff/···/gg | |
| | /hh | |
| /cccc/iii/···/jjjjjjj | /cccc/iii/···/j7 | SHORTENED |
| ··· | ··· | ··· |

FIG.2

| ID (30/31) | TYPE (32) | IP ADDRESS (33) | SHARED NAME (34) | MAX LENGTH (35) | STATE (36) |
|---|---|---|---|---|---|
| 001 | TRANSFER SOURCE | 192.168.1.2 | /dir1 | 2500 | COMPLETE |
| 001 | TRANSFER DESTINATION | 192.168.1.5 | /dir1 | 2000 | COMPLETE |
| 002 | TRANSFER SOURCE | 192.168.1.5 | /dir1 | 2000 | NOT PERFORMED |
| 002 | TRANSFER DESTINATION | 192.168.1.3 | /dir1 | 3000 | NOT PERFORMED |

FIG.3

| DIRECTORY TREE (40/41) | PATH LENGTH (42) | STATE (43) |
|---|---|---|
| /aaaa/bbbb | 10 | COMPLETE |
| /bbbb/ccccc | 11 | COMPLETE |
| /bbbb/dd | | CURRENTLY IN PROGRESS |
| ... | ... | ... |

FIG.4

| TRANSFER-SOURCE DIRECTORY TREE (50/51) | TRANSFER-DESTINATION DIRECTORY TREE (52) | FORM (53) |
|---|---|---|
| /aaaa/bbbb | /aaaa/bbbb | NO CHANGE |
| /bbbb/ccccc | /bbbb/ccccc | NO CHANGE |
| /bbbb/dd/···/ee/ff/···/gg/hh | /bbbb/dd/···/ee | Link |
| | /ff/···/gg | |
| | /hh | |
| /cccc/iii/···/jjjjjjjj | /cccc/iii/···/j7 | SHORTENED |
| ... | ... | ... |

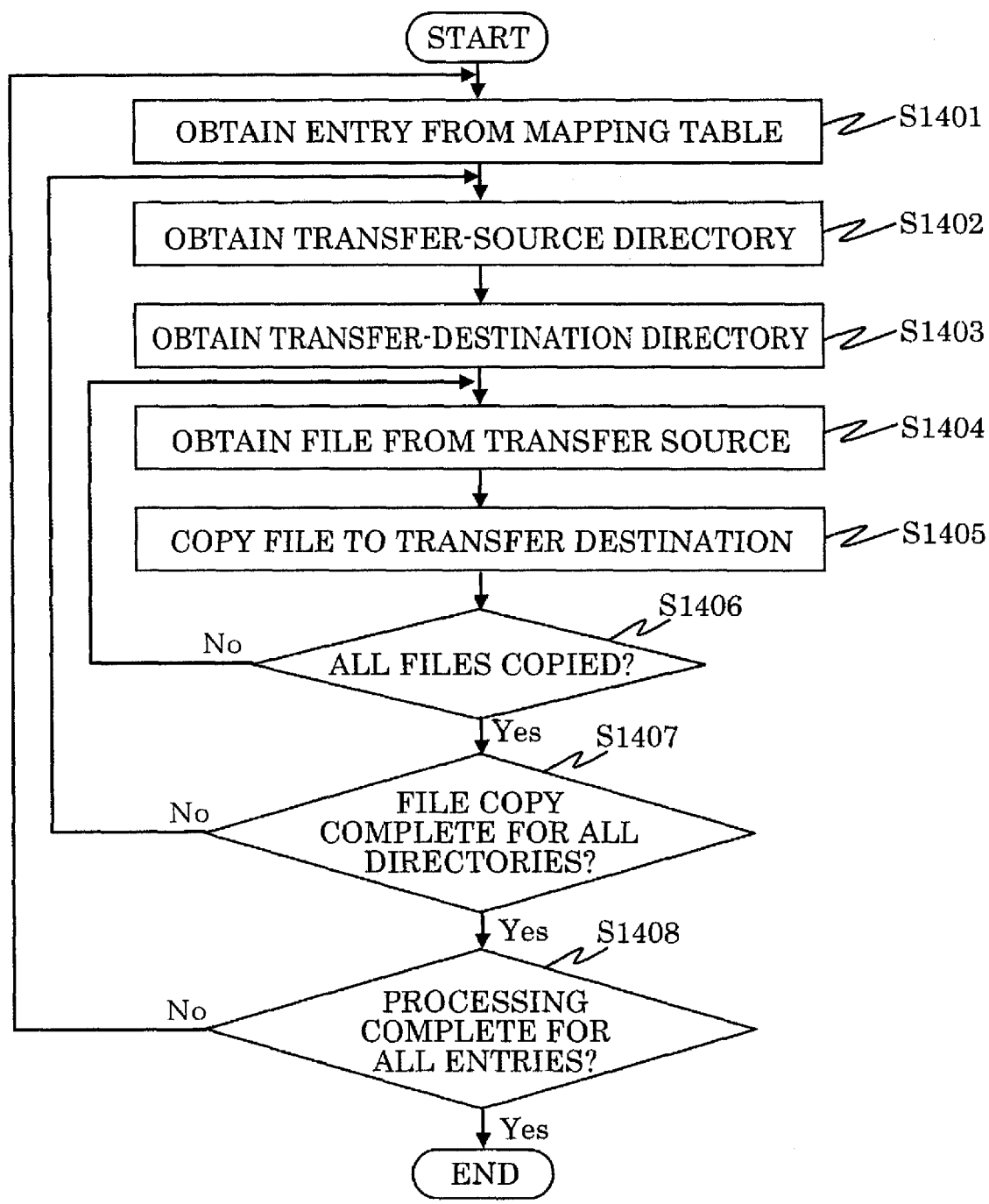

FIG.10

STORAGE INFORMATION INPUT SCREEN — 200

TRANSFER SOURCE
- IP ADDRESS: 192.168.1.2 — 201
- SHARED NAME: /dir1 — 202
- MAX PATH LENGTH: 2500 — 203

TRANSFER DESTINATION
- IP ADDRESS: 192.168.1.5 — 204
- SHARED NAME: /dir1 — 205
- MAX PATH LENGTH: 2000 — 206

TRANSFER CHECK SCREEN (301, 302) — 300

| TRANSFER-SOURCE DIRECTORY TREE | TRANSFER-DESTINATION DIRECTORY TREE |
|---|---|
| /aaaa/bbbb | /aaaa/bbbb |
| /bbbb/ccccc | /bbbb/ccccc |
| /bbbb/dd/···/ee/ff/···/gg/hh | /bbbb/dd/···/ee |
|  | /ff/···/gg |
|  | /hh |
| /cccc/iii/···/jjjjjjj | /cccc/iii/···/j7 |
| ··· | ··· |

[ OK ] — 303

US 8,046,392 B2

STORAGE SYSTEM AND INFORMATION TRANSFER METHOD FOR THE SAME

CROSS-REFERENCES TO RELATED APPLICATIONS

This application relates to and claims priority from Japanese Patent Application No. 2007-118967, filed on Apr. 27, 2007, the entire disclosure of which is incorporated herein by reference.

BACKGROUND

1. Field of the Invention

The invention relates generally to a technique for transferring information from one storage device to another storage device in a plurality of storage devices connected via a network.

2. Description of Related Art

A storage device typified by a disk array device logically divides a storage area of a disk device in the storage device and provides the divided storage areas as volumes (logical storage areas) to a host computer. When such a storage device is connected to a network, the host computer is connected to the storage device via the network to write-access and read-access to the volumes. As an example of a storage device that provides volumes to the host computer via a network, a NAS (Network Attached Storage) device is well known. The NAS device runs an OS (Operating System) and a file system, keeps information about files and directories stored in each volume, and inputs or outputs a file(s) in response to a request from the host computer.

When the performance or capacity of such a NAS system becomes insufficient, a possible solution to this problem would be to transfer data in the existing NAS device to a new NAS device to use the data from the existing NAS device in the new NAS device. This operation is referred to as data transfer between storage devices.

As a method for transferring data between NAS devices, a method for transferring a file by creating a hierarchical structure of the directories stored in an existing NAS device (i.e., a directory tree) in advance in a new NAS device and then transferring a file from the existing NAS system to the new NAS system in response to an access request from a host system has been disclosed (see JP 2004-46661 A).

There has also been proposed another method by which, even if access to a file that has not been transferred to the new NAS device is requested when transferring files from the existing NAS device to the new NAS device, the requested file is immediately identified on the file system of the existing NAS device storing the file, data is obtained from the existing NAS device and provided to a client, and a file providing service is transferred from the existing NAS device to the new NAS device in a relatively short time (see JP2006-39814 A).

OSs and file systems of NAS devices may differ depending on the type of the NAS devices. Due to that difference, for example, the maximum full path length of a directory tree that can be handled by a NAS device may be different. Therefore, when the maximum full path length of a directory tree that can be handled by the existing NAS device is longer than that in the new NAS device, the directory tree in the existing NAS device may not be able to be created in the new NAS device. Accordingly, an operator has to check in advance the directory structure of the existing NAS device and see whether or not the directory structure can be created in the new NAS device. If it is determined that the directory structure cannot be created in the new NAS device, the operator has to change the directory structure of the existing NAS device before the transfer, which increases the operator's workload.

Meanwhile, when a user of the NAS devices uses a desired file or directory, the user has to check whether or not the desired file or directory exists. Accordingly, just changing the directory structure of the existing NAS device would not allow the user to understand the details of the change, and would increase the user's workload when retrieving files or directories.

SUMMARY

It is an object of the present invention to transfer information from a transfer source to a transfer destination only on the condition that the management structure for the information at the transfer source corresponds to that at the transfer destination.

In order to achieve the object above, the present invention is characterized in that when transferring first information stored in a storage area of a transfer-source storage device to a storage area of a transfer-destination storage device, if a first limit value for a first management structure for managing the first information at the transfer-source storage device exceeds a second limit value for a second management structure for managing second information at the transfer-destination storage device, the first management structure is converted so that the property of the first management structure does not exceed the second limit value, and information according to the converted management structure is transferred to the transfer-destination storage device.

Specifically, according to an aspect of the present invention, a storage system includes: a first storage device that includes a first file system; a second storage device that includes a second file system; and a control unit that controls transfer of a file stored in a storage area in the first storage device to a storage area in the second storage device, the control unit performing the following operations: collecting from the first storage device first information about a first management structure of the first file system; collecting from the second storage device second information about a second management structure of the second file system; comparing the first information with the second information and judging whether or not a first limit value for the first management structure exceeds a second limit value for the second management structure; and if the first limit value exceeds the second limit value, converting the first management structure so that the property of the first management structure does not exceed the second limit value, arranging the second file system so that it includes the converted management structure, and transferring the file stored in the first storage device to the second storage device, using the converted management structure included in the second file system.

In the above-described aspect of the present invention, the storage system preferably has the following features. Specifically, the first management structure is configured by a first directory tree in the first file system, the second management structure is configured by a second directory tree in the second file system, the first limit value is a first upper limit value when creating the first directory tree in the first file system, and the second limit value is a second upper limit value when creating the second directory tree in the second file system. The first upper limit value is the maximum path length of the first directory tree, the second upper limit is the maximum path length of the second directory tree, and the control unit judges whether or not the maximum path length of the first directory tree exceeds the maximum path length of the second directory tree. If the control unit determines that the maximum path length of the first directory tree exceeds the maximum path length of the second directory tree, the control unit divides the first directory tree into directory trees so that each divided directory tree is structured within the maximum path length and can be handled by the second file system, and the control unit associates the divided directory trees with each other.

According to another aspect of the present invention, provided is a storage system information transfer method, the storage system including: a first storage device having a first file system; a second storage device having a second file system; and a control unit that is connected via a network to the first storage device and the second storage device and controls information transfer between the first storage device and the second storage device, the control unit controlling transfer of a file stored in a storage area of the first storage device to a storage area of the second storage device, and the method including the following steps performed by the control unit: a first step of collecting first information about a first management structure of the first file system from the first storage device; a second step of collecting second information about a second management structure of the second file system from the second storage device; a third step of comparing the first information with the second information and judging whether or not a first limit value for the first management structure exceeds a second limit value for the second management structure; a fourth step of arranging, if the first limit value exceeds the second limit value, the first management structure so that the property of the first management structure does not exceed the second limit value; and a fifth step of arranging the second file system so that it includes the management structure converted in the fourth step and transferring the file stored in the first storage device to the second storage device, using the converted management structure included in the second file system.

According to another aspect of the present invention, provided is a storage system information transfer method, the storage system including: a first storage device that provides at least one logical storage area via a network; a second storage device that provides at least one logical storage area via the network; and a host system that controls information transfer between the first storage device and the second storage device via the network, the host system controlling transfer of information stored in the logical storage area of the first storage device to the logical storage area of the second storage device, the method including the following steps performed by the host system: a first step of collecting via the network a structure of a directory tree created in the logical storage area of the first storage device; a second step of converting the structure of the directory tree collected in the first step so that it is structured within the maximum path length of a directory tree that can be handled by the second storage device; a third step of creating the directory tree converted in the second step in the logical storage area of the second storage device; and a fourth step of transferring a file stored in each directory tree of the logical storage area of the first storage device to the directory tree created in the third step.

In the above-described aspect of the present invention, the storage system information transfer method preferably has the below features. Specifically, in the second step, the host system divides the directory tree of the first storage device—whose maximum path length exceeds that of the directory tree of the second storage device—so that each divided directory tree will have a path length equal to or shorter than the maximum path length for a directory tree permitted in the second storage device only if the maximum path length of the directory tree of the first storage device exceeds the maximum path length for a directory tree in the second storage device, and in the third step, the host system associates and connects the plurality of divided directory trees with each other via link information, and the host system transfers files stored in the plurality of directories connected via the link information to the logical storage area in the second storage device. The link information that associates the plurality of directory trees is a symbolic link. The link information that associates the plurality of directory trees is a shortcut.

According to the present invention, the directory structure of the transfer-source storage device does not have to be changed before transferring information, thereby reducing the operator's workload.

Other aspects and advantages of the invention will be apparent from the following description and the appended claims.

BRIEF DESCRIPTION OF THE DRAWINGS

FIG. 2 is a configuration diagram of a storage management table.

FIG. 3 is a configuration diagram of a directory tree table.

FIG. 4 is a configuration diagram of a mapping table.

FIG. 9 is a flowchart explaining processing for copying a file from the transfer-source storage device to the transfer-destination storage device.

FIG. 10 is a configuration diagram of a storage information input screen.

FIG. 11 is a configuration diagram of a transfer check screen.

DETAILED DESCRIPTION OF PREFERRED EMBODIMENTS

Embodiments of the present invention will be described below with reference to the attached drawings.

First Embodiment

Figure 1:
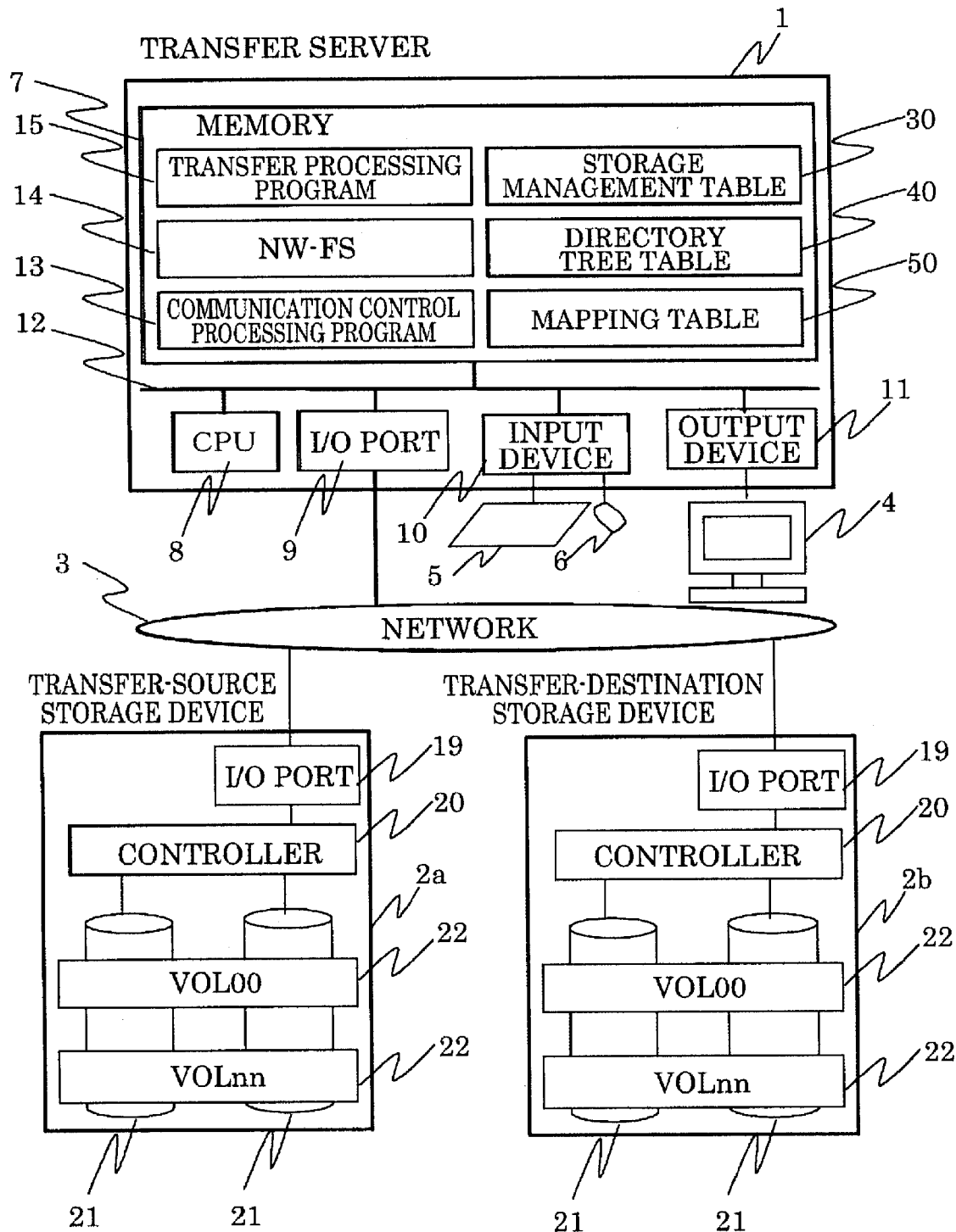
FIG. 1 is a block diagram showing the configuration of a storage system according to a first embodiment of the present invention.

FIG. 1 shows the configuration of a storage system according to a first embodiment of the present invention. In FIG. 1, the storage system includes a transfer server 1 as a host system or a control unit, a transfer-source storage device (a first storage device) 2a and a transfer-destination storage device (a second storage device) 2b. The transfer server 1 is connected to the transfer-source storage device 2a and the transfer-destination storage device 2b via a network 3.

The transfer server 1 includes a memory 7, a CPU 8, an I/O port 9 that allows connection to the network 3, an input device 10 connected to a keyboard 5 and a mouse 6 and an output device 11 connected to a display device 4, with the components being connected via an internal bus 12.

The memory 7 stores: a communication control processing program 13 for performing communication according to a communication protocol for the network 3; a network file system 14 that controls access to the transfer-source storage device 2a and the transfer-destination storage device 2b; and a transfer processing program 15 to execute processing for transferring information from the transfer-source storage device 2a to the transfer-destination storage device 2b. The CPU 8 executes these programs. The memory 7 also stores a storage management table 30, a directory tree table 40 and a mapping table 50 that are used by the CPU 8 based on the transfer processing program 15. Although not shown, the memory 7 also stores an operating system.

The transfer-source storage device 2a and the transfer-destination storage device 2b each include: an I/O port 19 that connects the storage device 2a, 2b to the network 3; a controller 20 that controls the storage device 2a, 2b; and a plurality of disk devices 21 that defines volumes 22 (logical storage areas). The controller 20 operates based on the operating system and the network file system to perform a variety of processing in response to file access requests input via the network 3.

The controller 20, the disk device 21 and the volumes 22 of the transfer-source storage device 2a serve as a first file system, while those of the transfer-destination storage device 2b serve as a second file system. A first directory tree (a first management structure), which is a hierarchical directory structure where files are arranged hierarchically, is created in the volumes 22 of the first file system, and a second directory tree (a second management structure) is created in the volumes 22 of the second file system. When the first directory tree is created in the first file system, a first upper limit value (a first limit value) is set as the maximum path length (the maximum path length from a root directory to a target directory) of the first directory tree. On the other hand, when the second directory tree is created in the second file system, a second upper limit value (a second limit value) is set as the maximum path length of the second directory tree.

When transferring a file stored in the logical storage area of the transfer-source storage device 2a to the logical storage area of the transfer-destination storage device 2b, the transfer server 1 serving as the host system or the control unit compares the file (first information) stored in the logical storage area of the transfer-source storage device 2a with a file (second information) stored in the logical storage area of the transfer-destination storage device 2b and judges whether or not the first limit value (first upper limit value) for the first management structure exceeds the second limit value (second upper limit value) for the second management structure. If it is determined that the first limit value exceeds the second limit value, the transfer server 1 converts the first management structure (directory tree) so that the property of the first management structure does not exceed the second limit value, and the transfer server 1 arranges the second file system of the transfer-destination device 2b so that it includes the converted management structure (directory tree), and then transfers the file stored in the transfer-source storage device 2a to the transfer-destination storage device 2b according to the converted management structure (directory tree) included in the transfer-destination storage device 2b.

In order to convert the first management structure so that the property of the first management structure does not exceed the second limit value, the transfer server 1 divides the first management structure (first directory tree) into directory trees so that each divided directory tree will have a length equal to or shorter than the maximum path length of the second directory tree that can be handled by the second file system of the transfer-destination storage device 2b. Then, the transfer server 1 associates the divided directory trees with each other based on link information and transfers the associated directory trees to the volume 22 of the transfer-destination storage device 2b.

FIGS. 2 to 4 show the details of the storage management table 30, the directory tree table 40 and the mapping table 50.

FIG. 2 shows an example of content entered in the storage management table 30. As shown, the storage management table 30 includes: a field 31 for entering an ID that identifies entry information; a field 32 for entering the type of the storage device, i.e., whether the relevant storage device is the transfer-source storage device 2a or the transfer-destination storage device 2b; a field 33 for entering an IP address set for the I/O port 19, a field 34 for entering a shared directory name provided by the storage device; a field 35 storing the maximum full path length of the directory tree that can be handled by the storage device; and a field 36 for entering the status, i.e., whether or not transfer has been completed. Note that transfer is performed between storage devices corresponding to entries having the same value in the fields 31.

For example, entries having the value "0001" in the field 31 indicates that the transfer of the content of a shared directory "/dir1" in the transfer-source storage device 2a having an IP address of "192.168.1.2" to a shared directory "/dir1" in the transfer-destination storage device 2b having an IP address of "192.168.1.5" is complete.

FIG. 3 shows an example of content entered in the directory tree table 40. As shown, the directory tree table 40 includes a field 41 for entering the path name of a directory tree, a field 42 for entering the full path length of the directory tree, and a field 43 for entering a status, i.e., whether or not checking of the full path of the directory tree is complete.

FIG. 2 shows, for example, that the full path length of a directory tree "/aaaa/bbbb" is "10", and that checking of the full path of the directory tree is complete. On the other hand, checking of the full path of a directory tree "bbbb/dd" is not complete.

FIG. 4 shows an example of content entered in the mapping table 50. As shown, the mapping table 50 includes: a field 51 for entering a directory tree of the transfer-source storage device 2a; a field 52 for entering a directory tree of the transfer-destination storage device 2b that corresponds to the directory tree in the field 51; and a field 53 for entering a transfer type of the directory tree in the field 51 and the directory tree in the field 52. The transfer type to be entered in the field 53 is any one of "no change"—indicating that the directory tree is unchanged, "link"—indicating that the directory tree is divided into directory trees and the divided directory trees are associated with each other, and "shortened"—indicating that the name of the directory constituting the directory tree has been shortened.

For example, the mapping table 50 shows that the directory tree "/bbbb/dd/ . . . /ee/ff/ . . . /gg/hh" in the transfer-source storage device 2a has been divided into "/bbbb/dd/ . . . /ee", "/ff/ . . . /gg" and "/hh" and that the divided directories are associated with each other. In associating these entries, a symbolic link or a shortcut of "/ff/" which is the first directory of the directory tree "/ff/ . . . /gg," is created for "/ee" which is the last directory of the directory tree "/bbbb/dd/ . . . /ee." Also, a symbolic link or a shortcut of "/hh," which is the first directory of the directory tree "/hh," is created for "/gg," which is the last directory of the directory tree "/ff/ . . . /gg".

Figure 5:
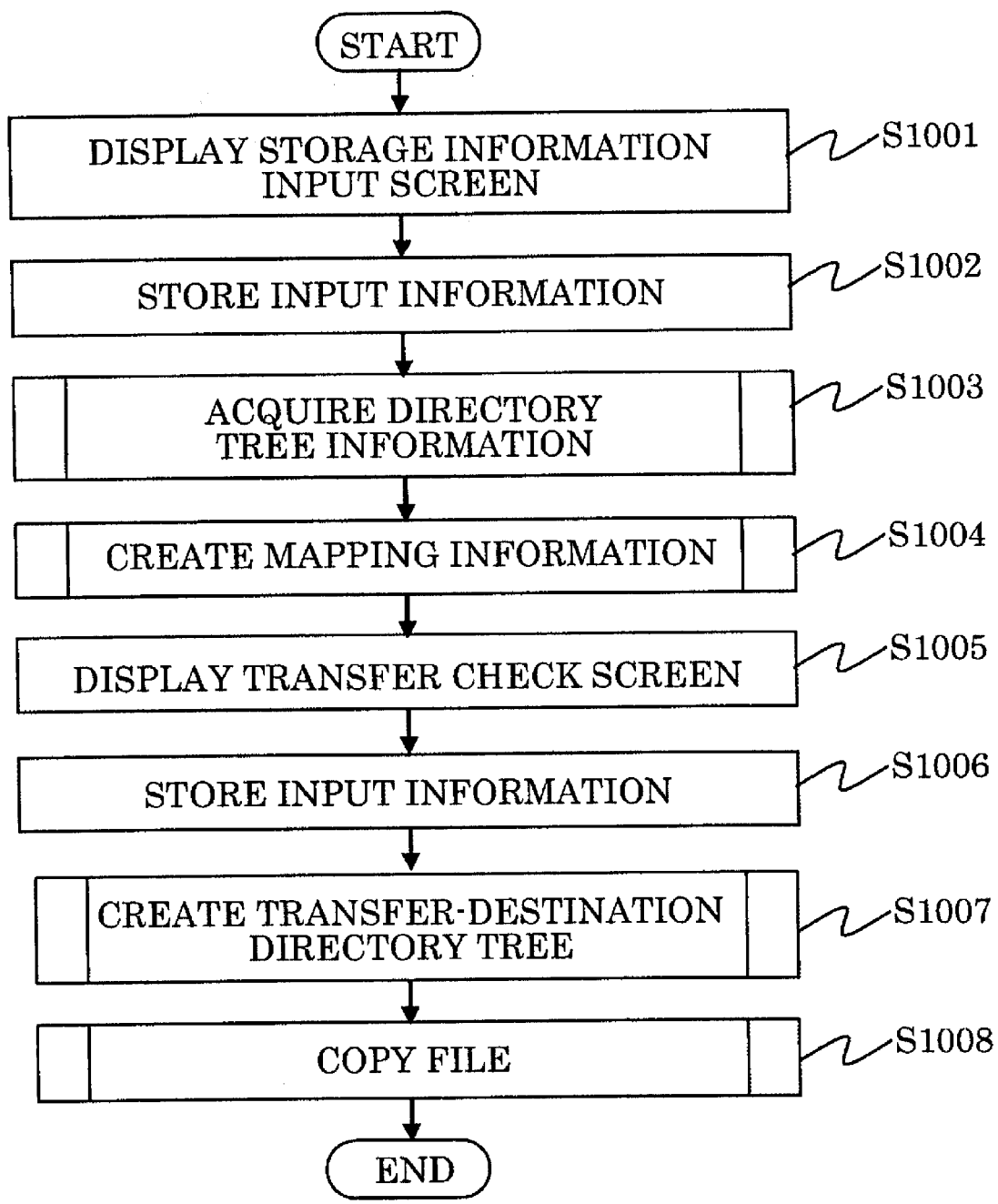
FIG. 5 is a flowchart explaining a processing sequence according to the above first embodiment.

Now, processing for transferring a directory or a file stored in a volume 22 in the transfer-source storage device 2a to a volume 22 in the transfer-destination storage device 2b will be described with reference to the flowchart shown in FIG. 5. The processing is implemented through various procedures executed by the CPU 8 based on the transfer processing program 15.

First, the CPU 8 executing the transfer processing program 15 displays a storage information input screen 200 on the display device 4 (S1001). FIG. 10 shows an example of the storage information input screen 200. The storage information input screen 200 includes: a field 201 for inputting the IP address set for the I/O port 19 of the transfer-source storage device 2a; a field 202 for inputting the shared directory name to be transferred in the transfer-source storage device 2a; a field 203 for inputting the maximum full path length of a directory tree that can be handled by the transfer-source storage device 2a; a field 204 for inputting the IP address set for the I/O port 19 of the transfer-destination storage device 2b; a field 205 for inputting the shared directory name of the transfer-destination storage device 2b; a field 206 for inputting the maximum full path length of a directory tree that can be handled by the transfer-destination storage device 2b; and an OK button 207 to be selected when input in the fields 201 to 206 is complete.

In this step, an operator inputs information in the fields 201 to 206 using the keyboard 5 or the mouse 6, and selects the OK button 207 when confirming the input information. If the OK button 207 is selected, the CPU 8 executes processing in accordance with the transfer processing program 15 and enters the information input in the storage information input screen 200 in the storage management table 30 and the directory tree table 40 (S1002).

Specifically, the CPU 8 enters an entry in the storage management table 30 by setting the information in the field 32 to "transfer source" and entering the input information in the fields 201, 202 and 203 respectively as entry information in the fields 33, 34 and 35. Likewise, the CPU 8 enters an entry in the storage management table 30 by setting the information in the field 32 to "transfer destination" and entering the input information in the fields 204, 205 and 206 respectively as the registration information in the fields 33, 34 and 35. In these two entries, the same ID that is not used in other entries is entered in the field 31 and the state "not performed" is entered in the field 36. In addition, the CPU 8 enters an entry in the directory tree table 40 by entering the input information in the field 202 as a shared directory name in the field 41 and setting the status of the field 43 to "currently in progress".

Next, based on the transfer processing program 15, the CPU 8 obtains the structure of the directory tree of the transfer-source storage device 2a and enters the obtained structure in the directory tree table 40 (S1003). Then, the CPU 8 converts the directory tree obtained in step S1001 so that the converted directory tree is structured within the maximum full path length of the directory tree that can be handled by the transfer-destination storage device 2b, and the CPU 8 then enters the correlation between the directory tree of the transfer-source storage device 2a and a directory tree to be created the transfer-destination storage device 2b in the mapping table 50 (S1004). The details of the S1003 and S1004 processing will be described later.

Next, the CPU 8 displays a transfer check screen 300 that displays the content of the mapping table 50 on the display device 4 (S1005). FIG. 11 shows an example of the transfer check screen 300. The transfer check screen 300 includes: a field 301 that displays a directory tree of the transfer-source storage device 2a; a field 302 that displays a directory tree to be created in the transfer-destination storage device 2b that corresponds to the directory tree in the field 301; and an OK button 303 to be selected when checking and changing have been completed.

Specifically, the field 301 displays the content entered in the field 51 in the mapping table 50, and the field 302 displays the content of the field 52 in the mapping table 50. An operator checks the content of the transfer check screen 300 and changes the content of the field 302 as needed. To confirm the changed content, the operator selects the OK button 303. Changing the field 302 includes shortening the directory name of the directory tree and changing the directory at which the directory tree is divided. When the OK button 03 is selected, the CPU 8 updates the entry in the mapping table 50 that corresponds to the content of the transfer check screen 300 (S1006).

Next, the CPU 8 refers to the content of the field 52 in the mapping table 50 and creates a directory tree in the transfer-destination storage device 2b (S1007) and copies a file stored in the transfer-source storage device 2a to the transfer-destination storage 2b (S1008). The details of the S1007 and S1008 processing will be described later.

Figure 6:
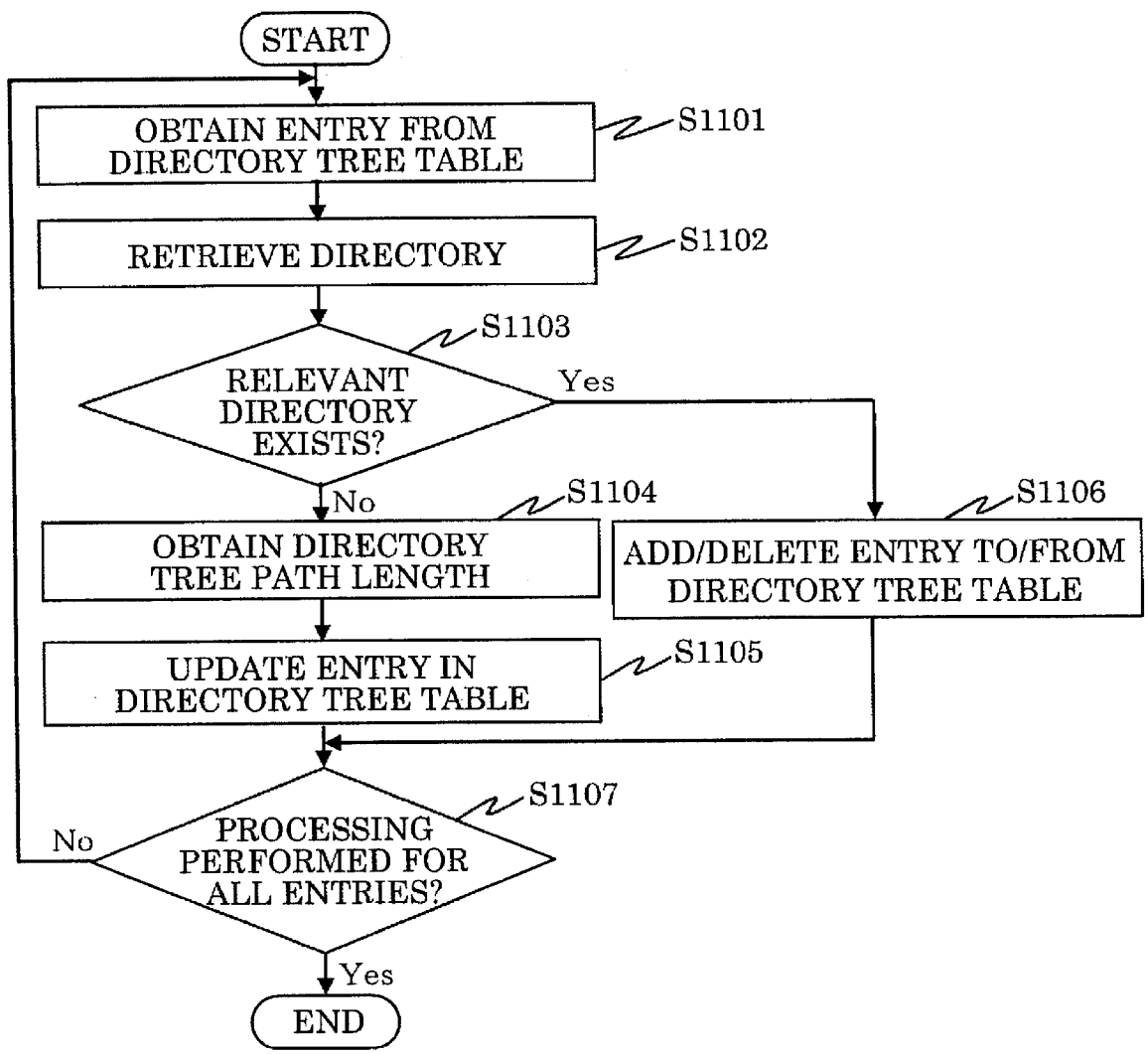
FIG. 6 is a flowchart explaining processing for obtaining a directory tree structure of a transfer-source storage device.

Now, the specific processing of S1003 in FIG. 5, i.e., the details of the processing for obtaining the structure of the directory tree of the transfer-source storage device 2a based on the transfer processing program 15, will be described with reference to the flowchart in FIG. 6.

First, based on the transfer processing program 15, the CPU 8 obtains one entry shown as "currently in progress" in the field 43 in the directory tree table 40 (S1101), retrieves from the transfer-source storage device 2a the names of all directories in the last directory of the directory tree of the obtained entry (S1102), and judges whether or not there is a directory for which checking of the full path length is completed (S1103). If there is no such directory, the CPU 8 obtains the full path length of the directory tree in the field 41 of the obtained entry (S1104), enters the full path length of the directory tree obtained in S1104 in the field 42 of the obtained entry, and changes the value of the field 43 to "completed", thereby updating the entry of the directory tree table 40 (S1106).

On the other hand, if it is determined that there is such a directory in S1103, the CPU 8 enters in the directory tree table 40 entries of all the directories retrieved in S1102, sets the values in the field 43 to "currently in progress" for the entered entries, and deletes the entry obtained in S1101 from the directory tree table 40 (S1106). Then, the CPU 8 judges whether or not the values in the fields 43 of all entries in the directory tree table 40 are "completed". If the values in the fields 43 of the all entries are not "completed", the CPU 8 returns to step S101; and if the values in the fields 43 of the all entries are "completed", the CPU 8 terminates the processing (S1107).

Figure 7:
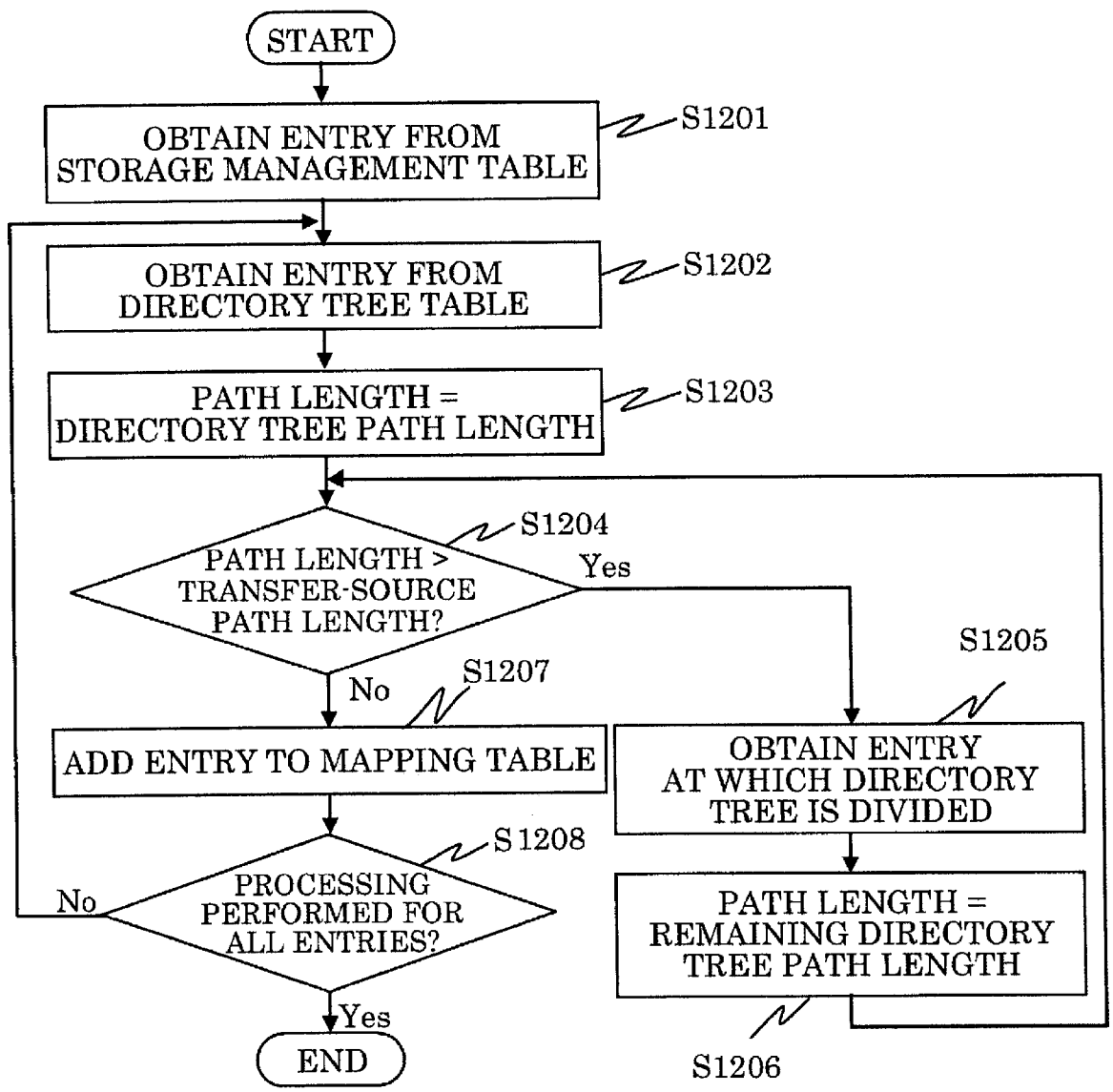
FIG. 7 is a flowchart explaining processing for creating the structure of a directory tree in a transfer-destination storage device.

Next, the specific processing of S1004 in FIG. 5, i.e., the details of the processing executed by the CPU 8 to identify the directory at which a directory tree of the transfer-source storage device 2a is divided so that the divided directory trees is structured within the full path length that can be handled by the transfer-destination storage device 2b, as well as the processing executed by the CPU 8 to create the mapping table 40, will be described with reference to the flowchart in FIG. 7.

First, based on the transfer processing program 15, the CPU 8 obtains from the storage management table 30 an entry shown as "transfer-destination" in the field 32 that has the same value in the field 31 as that of the transfer-source storage device 2a (S1201), and obtains the value in the field 35 of the obtained entry, i.e., the maximum full path length of the directory tree that can be handled by the transfer-destination storage device 2b (this maximum full path length will be hereinafter referred to as the "transfer-destination full path length"). Next, the CPU 8 obtains one entry from the directory tree table 40 and sets a full path name in the field 41 of the directory tree of the transfer-source storage device 2a based on a full path name of a directory tree that is to be created in the transfer-destination storage device 2b (hereinafter, referred to as a transfer-destination full path name), and then the CPU 8 obtains the path length of the transfer-source full path name, which is a value in the field 42 (S1202), and sets the path length of the transfer-source full path name as a path length (S1203).

Next, the CPU 8 judges whether or not the path length exceeds the transfer-destination full path length (S1204). When it is determined that the path length exceeds the transfer-destination full path length, the CPU 8 obtains a directory (location) at which the directory tree can be divided so that the divided directory trees will be equal to or shorter than the transfer-destination full path length of the transfer-destination full path name, and the CPU 8 then divides the directory tree into a directory tree from the top of the transfer-destination full path name to the obtained directory and a directory tree of directories after the obtained directory (hereinafter referred to as the "remaining directory tree") (S1205). Then, the CPU 8 sets the full path length of the remaining directory tree as the path length and sets the remaining directory tree as the transfer-destination full path name (S1206) and performs the S1204 processing again.

On the other hand, if it is determined that the path length does not exceed the transfer-destination full path length, the CPU 8 enters in the mapping table 50 the full path name of the directory tree of the transfer-source device 2a shown in the field 41 of the entry of the directory tree table 40 obtained in S1202 and the transfer-destination full path name (S1207). Specifically, the CPU 8 enters the full path name of the directory tree of the transfer-source storage device 2a in the field 51 of the mapping table 50 and enters the transfer-destination full path name in the field 51. If the CPU 8 has performed steps S1205 and S1206 in this processing, the CPU 8 enters full path names of all the directories divided in S1205 and enters the type "link" in the field 53. On the other hand, if the CPU 8 has not performed steps S1205 and S1206, the CPU 8 enters the type "no change" in the field 53.

Next, the CPU 8 judges whether or not the above-described processing has been performed for all the entries in the directory tree table 50 (S1208). If it is determined that the processing has not been performed for all the entries, the CPU 8 returns to S1203 to perform the processing for the next entry. If it is determined that the processing has been performed for all the entries, the CPU 8 terminates the processing.

Figure 8:
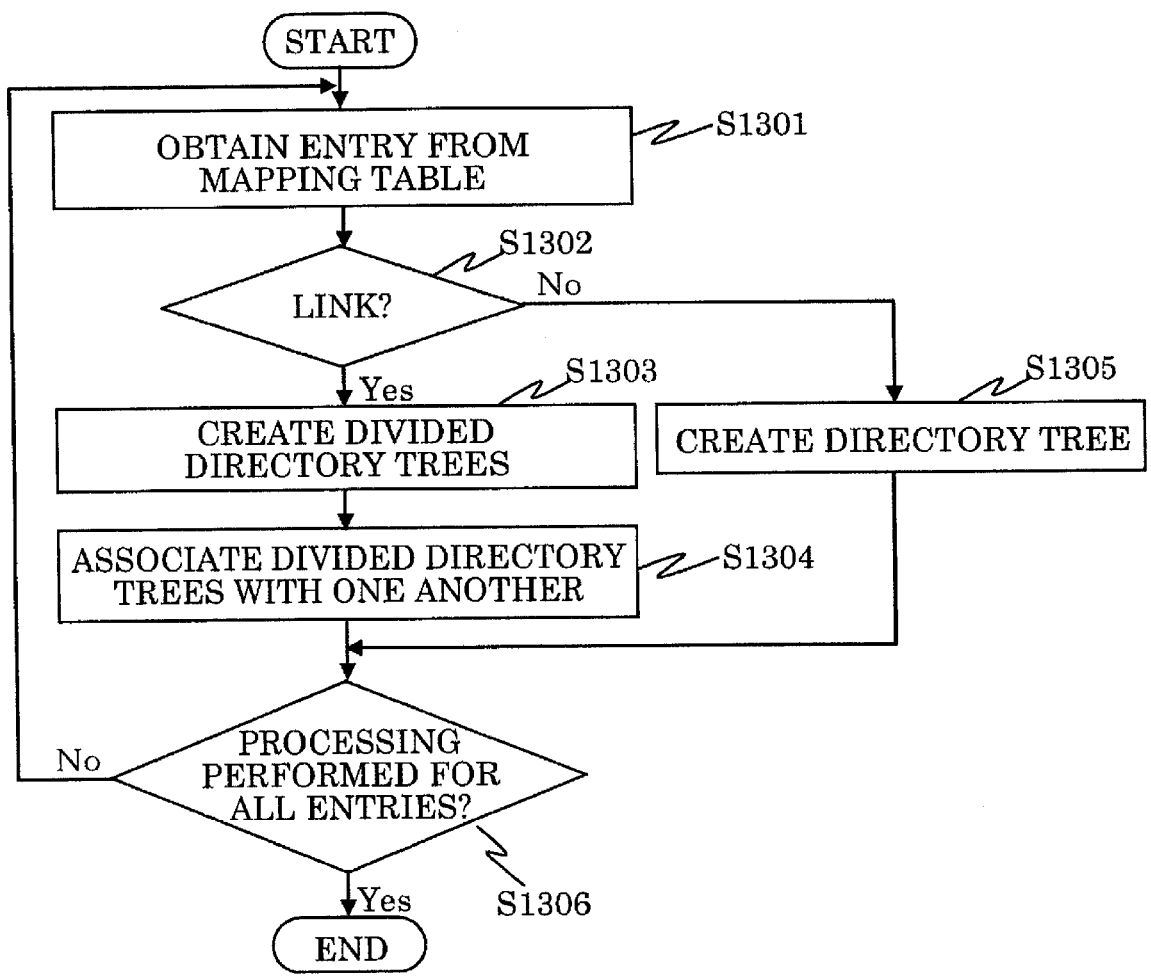
FIG. 8 is a flowchart explaining processing for creating a directory tree in the transfer-destination storage device.

Next, the processing details of S1007 in FIG. 5, i.e. the processing executed by the CPU 8 to create a directory tree in the transfer-destination storage device 2b based on the transfer processing program 15 will be described with reference to the flowchart shown in FIG. 8.

First, the CPU 8 obtains one entry from the mapping table 50 based on the transfer processing program 15 (S1301). Next, the CPU 8 judges whether or not the value in the field 53 of the obtained entry is "link." If it is determined that the value in the field 53 is "link", the CPU 8 creates all the directory trees in the field 52 of the obtained entry in the transfer-destination storage device 2b (S1302). Then, the CPU 8 associates the created directory trees with each other (S1304) and proceeds to S1306.

In S1304 in the case of, for example, the third entry shown in FIG. 4, a symbolic link or a shortcut for the first directory "/ff" in the directory tree "/ff/ . . . /gg" is attached to the last directory "/ee" in the directory tree "/bbbb/dd/ . . . /ee". Also, a symbolic link or a shortcut for the first directory "/hh" in the directory tree "/hh" is attached to the last directory "/gg" in the directory tree "/ff/ . . . /gg".

On the other hand, if it is determined in S1302 that the value in the field 53 is not "link", the CPU 8 creates the directory tree in the field 52 of the obtained entry of the mapping table 50 in the transfer-destination storage device 2b (S1305). Then, the CPU 8 checks if the processing has been performed for all the entries in the mapping table 50 (S1306). If it is determined that the processing has not been performed for all the entries, the CPU 8 returns to S1301 to perform the processing for the next entry. If it is determined that the processing has been performed for all the entries, the CPU 8 terminates the processing.

Next, the processing details for S1008 shown in FIG. 5, i.e., the processing executed by the CPU 8 to copy a file stored in the transfer-source storage device 2a to the transfer-destination storage device 2b based on the transfer processing program 15 will be described with reference to the flowchart shown in FIG. 9.

First, based on the transfer processing program 15, the CPU 8 obtains one entry from the mapping table 50 (S1401) and obtains the value in the field 51, which is the full path name of a directory tree in the transfer-source storage device 2a (hereinafter referred to as the "transfer-source full path name"), and a value in the field 52, which is the full path name of a directory tree in the transfer-destination storage device 2b (hereinafter referred to as the "transfer-destination full path name").

Next, the CPU 8 obtains the directory name included in the directory tree from the transfer-source full path name (hereinafter referred to as the "transfer-source directory name") (S1402), and then obtains from the transfer-destination full path name the directory name of the transfer-destination storage device 2b (hereinafter referred to as the "transfer-destination directory name") that corresponds to the transfer-source directory name (S1403).

Next, the CPU 8 obtains a file stored in the transfer-source directory (S1404) and copies the file obtained in S1404 to the transfer-destination directory (S1405). Then, the CPU 8 checks if all the files in the transfer-source directory have been copied in the transfer-destination directory (S1406). If not all the files have been copied, steps S1404 and 1405 are performed again to copy the next file. On the other hand, if all the files have been copied, the CPU 8 checks if file copy for all the directories included in the transfer-source full path name has been completed (S1407). If the file copy is not complete, the CPU 8 returns to S1402. On the other hand, if the file copy is complete, the CPU 8 proceeds to S1408, where it judges whether or not the processing for all the entries in the mapping table 50 has been completed. If the processing has not been completed, the CPU 8 returns to S1401 and performs the processing for the next entry in the mapping table 50.

According to the first embodiment, if the full path length of the directory tree of the transfer-source storage device 2a exceeds the maximum full path length of a directory tree that can be handled by the transfer-destination storage device 2b, the transfer server 1 divides the directory tree of the transfer-source storage device 2a so that the divided directory trees is structured within the maximum full path length of a directory tree that can be handled by the storage device 2b, creates the divided directory trees in the transfer-destination storage device 2b, and associates the divided directory trees with each other using a symbolic link or a shortcut. As a result, the directory structure of the transfer-source storage device 2a does not have to be changed before transferring files and, as a result, the operator's workload can be reduced. In addition, since the divided directories are associated with each other, the storage device 2b user's workload can also be reduced.

Second Embodiment

Figure 12:
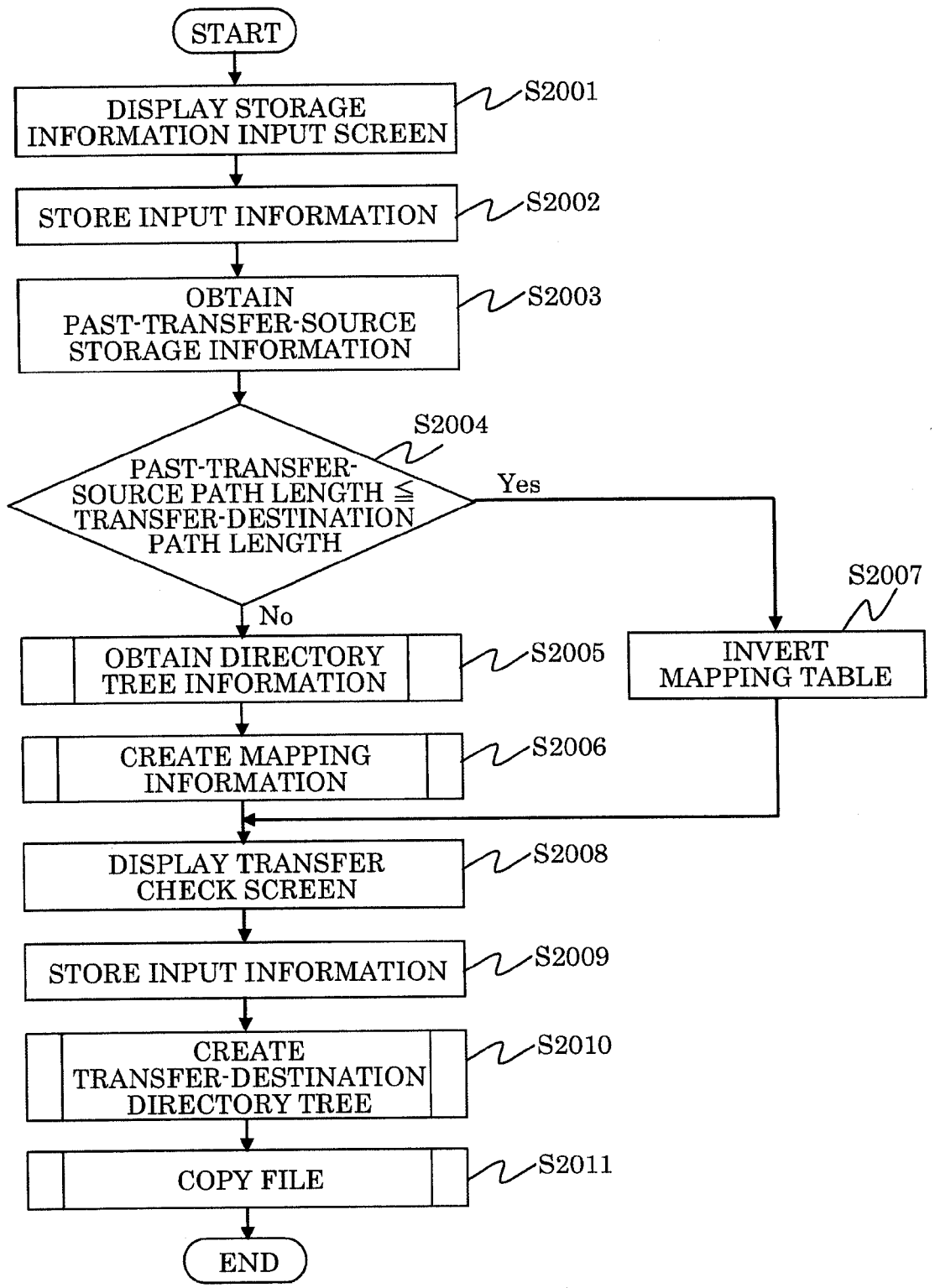
FIG. 12 is a flowchart explaining a processing sequence according to a second embodiment of the present invention.

Next, the second embodiment of the present invention will be described below with reference to the flowchart shown in FIG. 12. Note that the configurations of the storage network system and transfer server 1 in the second embodiment are same as those in the first embodiment, and so their descriptions have been omitted. Likewise, descriptions for other components or arrangements the same as those in the first embodiment will also be omitted.

First, based on the transfer-processing program 15, the CPU 8 displays the storage information input screen 200 on the display device 4 (S2001). In this step, an operator inputs information in the fields 201 to 206 using the keyboard 5 or the mouse 6, and selects the OK button 207 after confirming the input information. When the OK button 207 is selected, the CPU 8 enters, based on the transfer processing program 15 (S2002), the information input in the storage information input screen 200 in the storage management table 30 and the directory tree table 40.

Next, the CPU 8 searches entries in the storage management table 30 for an entry that has the value "transfer-destination" in the field 32 and has the same values in fields 33 and 34 as an entry entered in the storage management table 30 in S2002 and having the value "transfer-source" in the field 32 (S2003). In other words, the CPU 8 checks if a storage device that was used in the past as a transfer-destination storage device 2b in the storage system according to the first embodiment of the present invention should be used as the transfer-source storage device 2a to transfer a file from that storage device. Then, the CPU 8 obtains from the storage management table 30 an entry having the same value in the field 31 as that in the obtained entry and having the value "transfer-source" in the field 32. In the following description, these two entries are referred to as the "past-transfer-source storage information" and the "past-transfer-destination storage information," respectively.

Next, the CPU 8 checks whether or not the value in the field 35 of an entry corresponding to the transfer-destination storage device 2b entered in the storage management table 30 in S2002, i.e., the full path length of the directory tree that can be handled by the transfer-destination storage device 2b (hereinafter referred to as the "transfer-destination full path length"), is equal to or longer than the value in the field 35 of the past-transfer-source storage information (hereinafter referred to as the "past-transfer-source storage full path length") (S2004).

If it is determined that the transfer-destination full path length is shorter than the past-transfer-source full path length in S2004, the CPU 8 obtains the structure of the directory tree in the transfer-source storage device 2a and enters the obtained directory tree in the directory tree table 40 (S2005). Then, the CPU 8 converts the directory tree obtained in S2005 so that it is structured within the maximum full path length of a directory tree that can be handled by the transfer-destination storage device 2b; and the CPU 8 enters, in the mapping table 50, the correlation between the directory tree in the transfer-source storage device 2a and the directory tree to be created in the transfer-destination storage device 2b (S2006). Subsequently, the CPU 8 proceeds to S2008. Note that the processing details of S2005 and S2006 are the same as those shown in FIGS. 6 and 7 in the first embodiment, their description has been omitted.

On the other hand, if it is determined that the transfer-destination full path length is equal to or longer than the past-transfer-source full path length in S2004, the CPU 8 inverts the content of the mapping table 50 used in the transfer performed between storage devices specified by the past-transfer-source storage information and the past-transfer-destination storage information (S2007). Specifically, values in the field 51 and the field 52 in the mapping table 50 are inverted.

Next, the CPU 8 displays on the display device 4 the transfer check screen 300, which displays the content of the mapping table 50 (S2008). In this step, the operator checks the content of the transfer check screen 300, changes the content of the field 302 as needed, and selects the OK button 303 to confirm the changed content. Changing the field 302 includes shortening the directory name of the directory tree and changing the directory at which the directory tree is divided. When the OK button 303 is selected, the CPU 8 updates the entry in the mapping table 50 that corresponds to the content of the transfer check screen 300 (S2009).

Next, the CPU 8 creates a directory tree in the transfer-destination storage device 2b by referring to the content of the field 52 in the mapping table 50 (S2010) and copies a file stored in the transfer-source storage device 2a to the transfer-destination storage device 2b (S2011). Since the processing details of S2010 and S2011 are the same as those shown in FIGS. 8 and 9 of the first embodiment, their description has been omitted.

According to the second embodiment, when in a situation where a directory tree is to be transferred from the transfer-destination storage device, to which a directory tree was transferred in the past by the method according to the present invention, to another transfer-destination storage device 2b, if the full path length of a directory tree that can be handled by the transfer-destination storage device 2b is equal to or longer than that of the past-transfer-source storage device, the structure of the directory tree can be converted back to that of the past-transfer-source storage device and a directory tree can be transferred to the transfer-destination storage device 2b.

Third Embodiment

Figure 13:
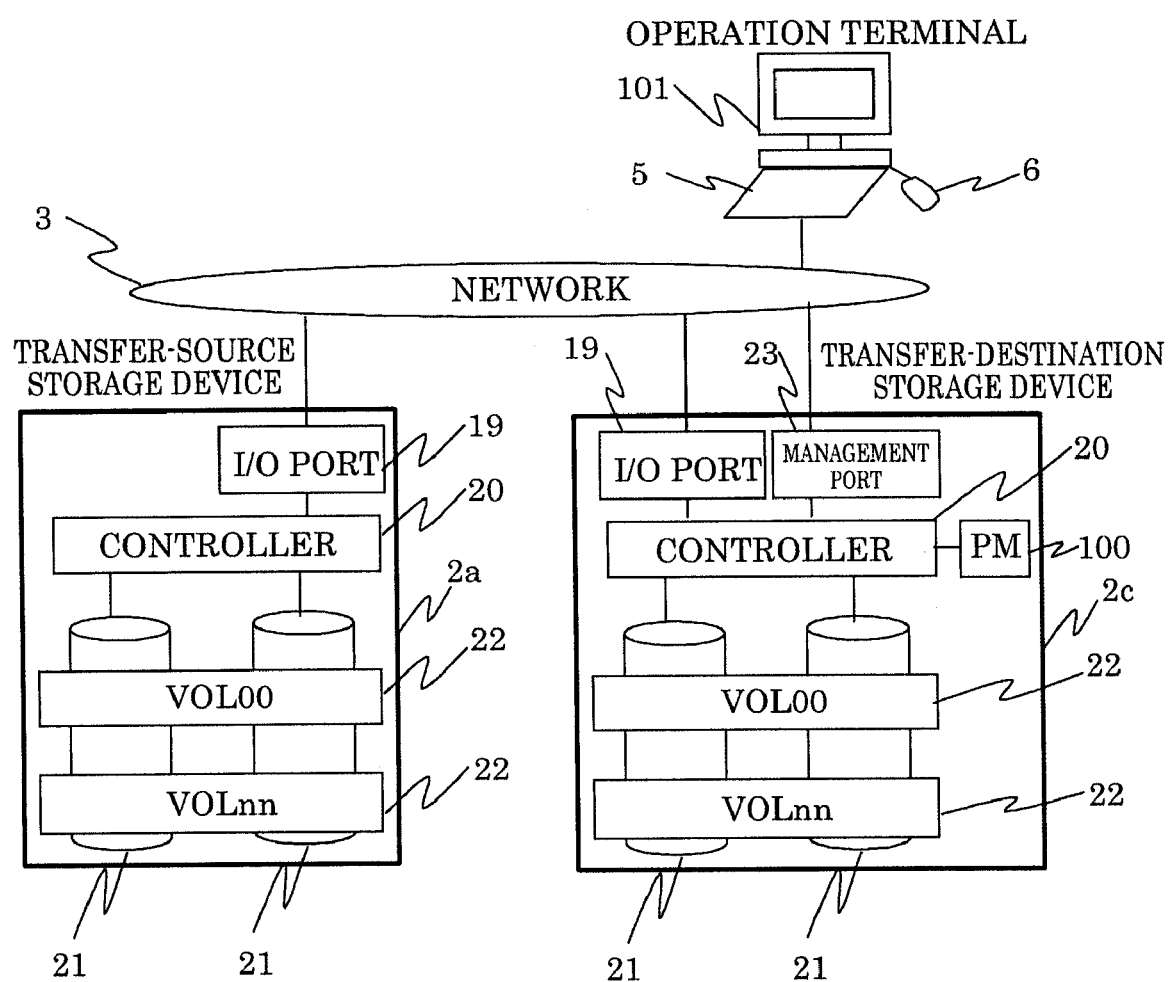
FIG. 13 is a block diagram showing the configuration of a storage system according to a third embodiment of the present invention.

Next, a third embodiment of the present invention will be described with reference to FIGS. 13 and 14. FIG. 13 is a system configuration diagram of a storage system according to the third embodiment of the present invention.

The storage network system in the third embodiment includes a network 3 to which at least one transfer-source storage device 2a, at least one transfer-destination storage device 2c, and an operation terminal 101 are connected.

The transfer-source storage device 2a includes: at least one I/O port 19 for connection to the network 3; a controller 20 that controls the storage device 2a; and at least one disk device 21 that constitutes at least one volume 22. In the controller 20, an operating system and a network file system run so that the controller 20 can execute processing in response to file access requests made via the network 3.

The transfer-destination storage device 2c includes: at least one I/O port 19 for connection to the network 3; a management port 23 used for managing the transfer-destination storage device 2c; a controller 20 that controls the transfer-destination storage device 2c; a program memory 100 that stores various programs and data tables for realizing the storage system information transfer method of the present invention;

and at least one disk device 21 that constitutes at least one volume 22. The controller 20 executes programs stored in the program memory 100.

The operation terminal 101 includes a keyboard 5 and a mouse 6 The operation terminal 101 is connected via the network 3 to the management port 23 of the transfer-destination storage device 2c to manage the transfer-destination storage device 2c. Note that the operation terminal may be a typical personal computer on which an operating system runs.

Figure 14:
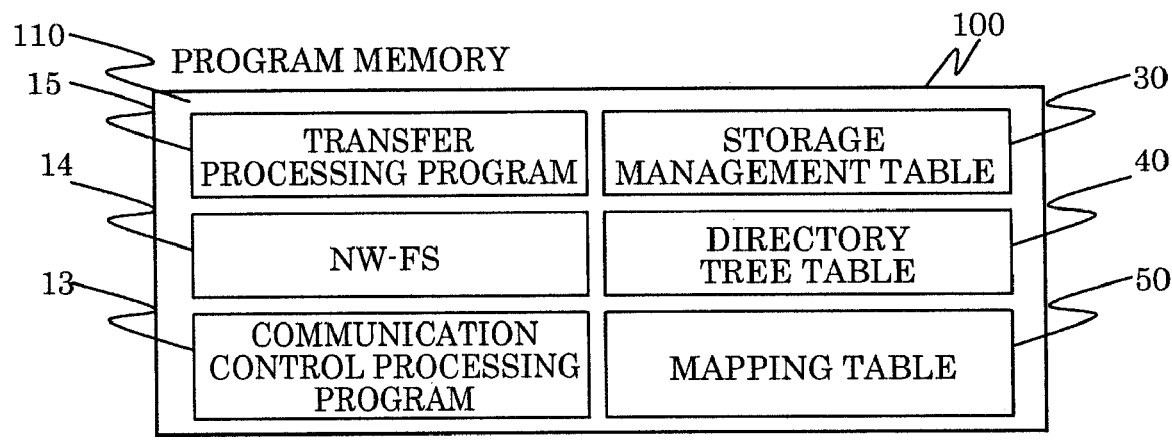
FIG. 14 is a block diagram showing the configuration of a program memory used in the above third embodiment of the present invention.

FIG. 14 is a block diagram of a program memory 100 of the transfer-destination storage device 2c. As shown in FIG. 14, the program memory 100 stores: a communication control processing program 13 for performing communication according to a communication protocol of the network 3, a network file system 14 that controls access to the transfer-source storage device 2a and the transfer-destination storage device 2c; and a transfer processing program 15 that performs the storage transfer method of the present invention. The controller 20 executes these programs. The memory 110 stores the storage management table 30, the directory tree table 40, and the mapping table 50 used by the controller 20 based on the transfer processing program 15. Note that the storage management table 30, the directory tree table 40, and the mapping table 50 are the same as those in the first embodiment; accordingly their description has been omitted.

After receiving a transfer execution request targeting the transfer-source storage device 2a from the operation terminal 101, the controller 20, serving as the control unit of the transfer-destination storage device 2c, executes the transfer processing program 15 stored in the program memory 100. Note that the processing of the transfer processing program 15 according to the third embodiment is the same as that of the first embodiment; accordingly, its description has been omitted.

According to the third embodiment, if the full path length of the directory tree in the transfer-source storage device 2a exceeds the maximum full path length of a directory tree that can be handled by the transfer-destination storage device 2c, the controller 20 of the transfer-destination storage device 2c divides the directory tree of the transfer-source storage device 2a into directory trees so that each divided directory tree is structured within the maximum full path length of a directory tree that can be handled by the transfer-destination storage device 2c. The controller 20 of the transfer-destination storage device 2c then creates the divided directory trees in the transfer-destination storage device 2c and associates the directory trees with each other using a symbolic link or a shortcut. As a result, the directory structure of the transfer-source storage device 2a does not have to be changed before transferring information, so the operator's workload can be reduced. In addition, since the divided directory trees are associated with each other, the storage device 2c user's workload can also be reduced.

What is claimed is:

1. A storage system comprising:
a first storage device that includes a first file system;
a second storage device that includes a second file system; and
a control unit that controls transfer of a file stored in a storage area in the first storage device to a storage area in the second storage device, the control unit performing the following operations:
    collecting from the first storage device first information about a first management structure of the first file system, said first management structure being configured by a first directory tree having a path length;
    collecting from the second storage device second information about a second management structure of the second file system, said second management structure being configured by a second directory tree having a path length;
    comparing the first information with the second information and judging whether or not a first limit value for the first management structure exceeds a second limit value for the second management structure; and
    if the first limit value exceeds the second limit value, converting the first management structure so that the property of the first management structure does not exceed the second limit value, arranging the second file system so that it includes the converted management structure, and transferring the file stored in the first storage device serving as a transfer source storage device to the second storage device serving as a transfer destination storage device, using the converted management structure included in the second file system;
wherein, if a maximum path length of the first directory tree created in the transfer-source storage device exceeds the full path length of a directory tree that can be handled by the transfer-destination storage device, the first directory tree in the transfer-source storage device is divided into a plurality of divided directory trees and the divided directory trees are created in the transfer-destination storage device and associated with each other using a symbolic link.

2. The storage system according to claim 1, wherein
the first limit value is a first upper limit value when creating the first directory tree in the first file system, and
the second limit value is a second upper limit value when creating the second directory tree in the second file system.

3. The storage system according to claim 2, wherein the first upper limit value is the maximum path length of the first directory tree,
the second upper limit value is the maximum path length of the second directory tree, and
the control unit judges whether or not the maximum path length of the first directory tree exceeds the maximum path length of the second directory tree.

4. The storage system according to claim 3, wherein when the control unit divides the first directory tree into a plurality of divided directory trees, each divided directory tree is structured within the maximum path length and can be handled by the second file system, and the control unit associates the divided directory trees with each other.

5. A storage system information transfer method, the storage system including: a first storage device having a first file system; a second storage device having a second file system; and a control unit that is connected via a network to the first storage device and the second storage device and controls information transfer between the first storage device and the second storage device, the control unit controlling transfer of a file stored in a storage area of the first storage device to a storage area of the second storage device,
the method comprising the following steps performed by the control unit:
a first step of collecting first information about a first management structure of the first file system from the first storage device, said first management structure being configured by a first directory tree having a path length;
a second step of collecting second information about a second management structure of the second file system from the second storage device, said second management structure being configured by a second directory tree having a path length;
a third step of comparing the first information with the second information and judging whether or not a first limit value for the first management structure exceeds a second limit value for the second management structure;
a fourth step of converting, if the first limit value exceeds the second limit value, the first management structure so that the property of the first management structure does not exceed the second limit value; and
a fifth step of arranging the second file system so that it includes the management structure converted in the fourth step and transferring the file stored in the first storage device serving as a transfer source storage device to the second storage device serving as a transfer destination storage device, using the converted management structure included in the second file system,
wherein, if a maximum path length of the first directory tree created in the transfer-source storage device exceeds the full path length of a directory tree that can be handled by the transfer-destination storage device, the first directory tree in the transfer-source storage device is divided into a plurality of divided directory trees and the divided directory trees are created in the transfer-destination storage device and associated with each other using a symbolic link.

6. The storage system information transfer method according to claim 5, wherein the first limit value is a first upper limit value when creating the first directory tree in the first file system, the second limit value is a second upper limit value when creating the second directory tree in the second file system, the first upper limit value is a maximum path length of the first directory tree, and the second upper limit value is a maximum path length of the second directory tree, then the control unit is configured so that: in the third step, it judges whether or not the maximum path length of the first directory tree exceeds the maximum path length of the second directory tree; in the fourth step, each divided directory tree is structured within the maximum path length of a directory tree and can be handled by the second file system; and in the fifth step, the control unit associates the divided directory trees with each other.

7. A storage system information transfer method, the storage system including: a first storage device that provides at least one logical storage area via a network; a second storage device that provides at least one logical storage area via the network; and a host system that controls information transfer between the first storage device and the second storage device via the network, the host system controlling transfer of information stored in the logical storage area of the first storage device to the logical storage area of the second storage device, the method comprising the following steps performed by the host system:
a first step of collecting via the network a structure of a directory tree created in the logical storage area of the first storage device serving as a transfer source storage device;
a second step of converting the structure of the directory tree collected in the first step so that it is structured within a maximum path length of a directory tree that can be handled by the second storage device;
a third step of creating the directory tree converted in the second step in the logical storage area of the second storage device serving as a transfer destination storage device; and
a fourth step of transferring a file stored in each directory tree of the logical storage area of the first storage device to the directory tree created in the third step;
wherein in the second step, the host system divides the directory tree of the first storage device whose maximum path length exceeds that of the directory tree of the second storage device into a plurality of divided directory trees so that each divided directory tree will have a path length equal to or shorter than the maximum path length of the directory tree accepted in the second storage device only if the maximum path length of the directory tree of the first storage device exceeds the maximum path length of the directory tree of the second storage device, and
in the third step, the host system associates and connects the plurality of divided directory trees with each other via link information, and the host system transfers files stored in the plurality of directories connected via the link information to the logical storage area of the second storage device.

8. The storage system information transfer method according to claim 7, wherein the link information that associates the plurality of directory trees is a symbolic link.

9. The storage system information transfer method according to claim 7, wherein the link information that associates the plurality of directory trees is a shortcut.

10. The storage system information transfer method according to claim 7, wherein the host system includes a storage unit that stores correlation information indicating a relationship between the structure of a first directory tree created in the logical storage area of the first storage device and the structure of a second directory tree created in the logical storage area of the second storage device,
wherein when the host system transfers, via the network, information stored in the logical storage area of the second storage device to a logical storage area that is provided by a third storage device, if the maximum path length of a third directory tree that can be handled by the third storage device is equal to or longer than the first directory tree of the first storage device, the host system creates, in the third step, based on the correlation information stored in the storage unit, a third directory tree having the same structure as that of the first directory tree of the first storage device, in the logical storage area of the third storage device, and
wherein in the fourth step, the host system transfers a file stored in the second directory tree created in the logical storage area of the second storage device to the third directory tree stored in the logical storage area of the third storage device.

* * * * *